(12) United States Patent
Hoch

(10) Patent No.: US 12,114,084 B2
(45) Date of Patent: Oct. 8, 2024

(54) IMAGE BASED LOCALIZATION

(71) Applicant: NEC Corporation Of America, Herzlia (IL)

(72) Inventor: Yaacov Hoch, Ramat-Gan (IL)

(73) Assignee: NEC Corporation Of America, Herzlia (IL)

( * ) Notice: Subject to any disclaimer, the term of this patent is extended or adjusted under 35 U.S.C. 154(b) by 17 days.

(21) Appl. No.: 17/872,086

(22) Filed: Jul. 25, 2022

(65) Prior Publication Data

US 2023/0292015 A1 Sep. 14, 2023

Related U.S. Application Data

(63) Continuation-in-part of application No. 17/689,109, filed on Mar. 8, 2022.

(51) Int. Cl.
| | |
|---|---|
| *H04N 23/951* | (2023.01) |
| *H04N 23/61* | (2023.01) |
| *H04N 23/74* | (2023.01) |
| *G08G 9/00* | (2006.01) |

(52) U.S. Cl.
CPC ........... *H04N 23/951* (2023.01); *H04N 23/61* (2023.01); *H04N 23/74* (2023.01); *G08G 9/00* (2013.01)

(58) Field of Classification Search
None
See application file for complete search history.

(56) References Cited

U.S. PATENT DOCUMENTS

| | | |
|---|---|---|
| 5,835,271 A | 11/1998 | Stump et al. |
| 6,215,519 B1 * | 4/2001 | Nayar ............... G08B 13/19608 |
| | | 348/E7.086 |
| 9,196,056 B2 | 11/2015 | Hall |
| 10,298,908 B2 | 5/2019 | Retterath |
| 10,972,655 B1 * | 4/2021 | Ostap ..................... H04N 7/147 |
| 11,117,570 B1 | 9/2021 | Broggi |

(Continued)

FOREIGN PATENT DOCUMENTS

| | | | | |
|---|---|---|---|---|
| CA | 2729712 A1 * | 12/2009 | ............. | G01S 19/14 |
| EP | 3547277 A1 * | 10/2019 | ............. | G06T 7/292 |

(Continued)

OTHER PUBLICATIONS

English translation of ES-2554549-T3, Lusher, Dec. 2015 (Year: 2015).*

(Continued)

*Primary Examiner* — James M Hannett

(57) ABSTRACT

There is provided a computer implemented method of computing a location of an object, comprising: accessing a wide field of view (wFOV) image captured by a wFOV image sensor located relative to an object, analyzing the wFOV image to identify a predefined feature, wherein the predefined feature indicates a low accuracy location of the object, capturing a high resolution image by a high resolution image sensor located relative to the object, the high resolution image depicting the predefined feature, and computing a high accuracy of location of the object according to an analysis of the predefined feature and according to a correlation between a location and orientation of the wFOV image sensor and the high resolution image sensor.

20 Claims, 5 Drawing Sheets

(56) References Cited

U.S. PATENT DOCUMENTS

| | | |
|---|---|---|
| 11,436,752 B1 | 9/2022 | Rublee |
| 2005/0185279 A1 | 8/2005 | Mullen et al. |
| 2005/0278098 A1 | 12/2005 | Breed |
| 2008/0212182 A1 | 9/2008 | Nilsen |
| 2009/0190237 A1 | 7/2009 | Silverstein et al. |
| 2010/0322471 A1 | 12/2010 | Treado et al. |
| 2014/0129073 A1 | 5/2014 | Ferguson |
| 2015/0288948 A1 | 10/2015 | Schamp et al. |
| 2016/0086018 A1 | 3/2016 | Lemoff |
| 2017/0059398 A1 | 3/2017 | Tennant et al. |
| 2017/0191822 A1 | 7/2017 | Becker et al. |
| 2017/0270375 A1 | 9/2017 | Grauer |
| 2017/0328729 A1 | 11/2017 | Zhu et al. |
| 2017/0363887 A1 | 12/2017 | Uyeno et al. |
| 2018/0081094 A1 | 3/2018 | Aikin et al. |
| 2019/0095721 A1* | 3/2019 | Ion .................. G06V 10/141 |
| 2019/0120967 A1 | 4/2019 | Smits |
| 2020/0255030 A1 | 8/2020 | Yamamoto et al. |
| 2020/0274998 A1 | 8/2020 | Herman et al. |
| 2020/0309688 A1 | 10/2020 | Park et al. |
| 2021/0190962 A1 | 6/2021 | Maimon et al. |
| 2021/0199769 A1 | 7/2021 | Meylan |
| 2021/0275084 A1 | 9/2021 | Tversky et al. |
| 2021/0323556 A1 | 10/2021 | Matsumura et al. |
| 2022/0003665 A1 | 1/2022 | Swenson et al. |
| 2022/0057519 A1 | 2/2022 | Goldstein et al. |
| 2022/0095923 A1 | 3/2022 | Seybold et al. |
| 2022/0137218 A1 | 5/2022 | Onal et al. |
| 2023/0247313 A1* | 8/2023 | Paris .................. H04N 23/698 345/419 |
| 2023/0288618 A1 | 9/2023 | Lev et al. |
| 2023/0290000 A1 | 9/2023 | Lev et al. |
| 2023/0290181 A1 | 9/2023 | Lieber et al. |
| 2023/0292013 A1 | 9/2023 | Lieber et al. |
| 2023/0316789 A1 | 10/2023 | Tsafrir et al. |
| 2023/0326253 A1 | 10/2023 | Shishido et al. |

FOREIGN PATENT DOCUMENTS

| | | | | |
|---|---|---|---|---|
| ES | 2554549 T3 | * | 12/2015 | ............ G01S 19/14 |
| SG | 191452 A1 | * | 7/2013 | |
| WO | WO-2008129552 A1 | * | 10/2008 | ............ G02B 13/06 |
| WO | WO-2011101856 A2 | * | 8/2011 | ........... G06K 9/6293 |

OTHER PUBLICATIONS

Minaee et al. "Deep-Emotion: Facial Expression Recognition Using Attentional Convolutional Network", ArXiv Preprint ArXiv:1902. 01019v1, P. 1-8, Feb. 4, 2019.

Official Action Dated Apr. 3, 2024 from the US Patent and Trademark Office Re. U.S. Appl. No. 17/741,476. (26 pages).

Steiner et al. "Design of an Active Multispectral SWIR Camera System for Skin Detection and Face Verification", Safety and Security Research Institute (ISF), Bonn-Rhein-Sieg University of Applied Sciences, Grantham-Allee 20, 53757 Sankt Augustin, Germany, Hindawi Publishing Corporation, vol. 2016 | Article ID 9682453, 1-16, Nov. 16, 2015.

Notice of Allowance Dated May 1, 2024 from the US Patent and Trademark Office Re. U.S. Appl. No. 17/741,476. (11 pages).

Notice of Allowance Dated May 22, 2024 from the US Patent and Trademark Office Re. Application No. 17/689, 109. (19 Pages).

Official Action Dated May 21, 2024 From the US Patent and Trademark Office Re. U.S. Appl. No. 17/851,099. (34 Pages).

Official Action Dated Feb. 13, 2024 from the US Patent and Trademark Office Re. U.S. Appl. No. 17/689,109. (27 pages).

Official Action Dated Jul. 1, 2024 From the US Patent and Trademark Office Re. U.S. Appl. No. 17/872,067. (42 Pages).

* cited by examiner

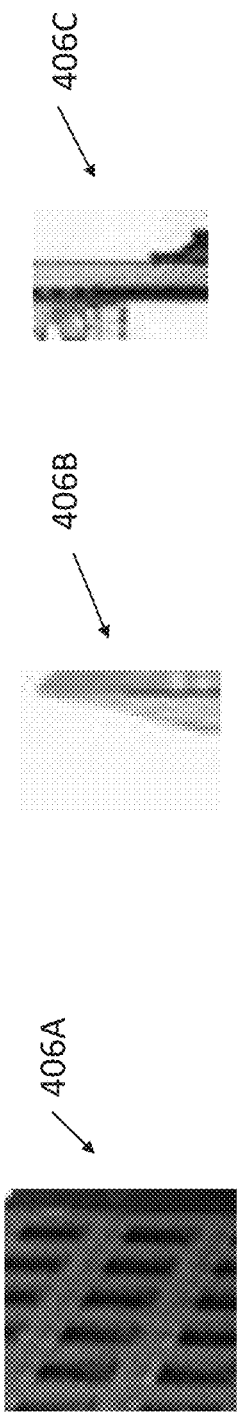
FIG. 4

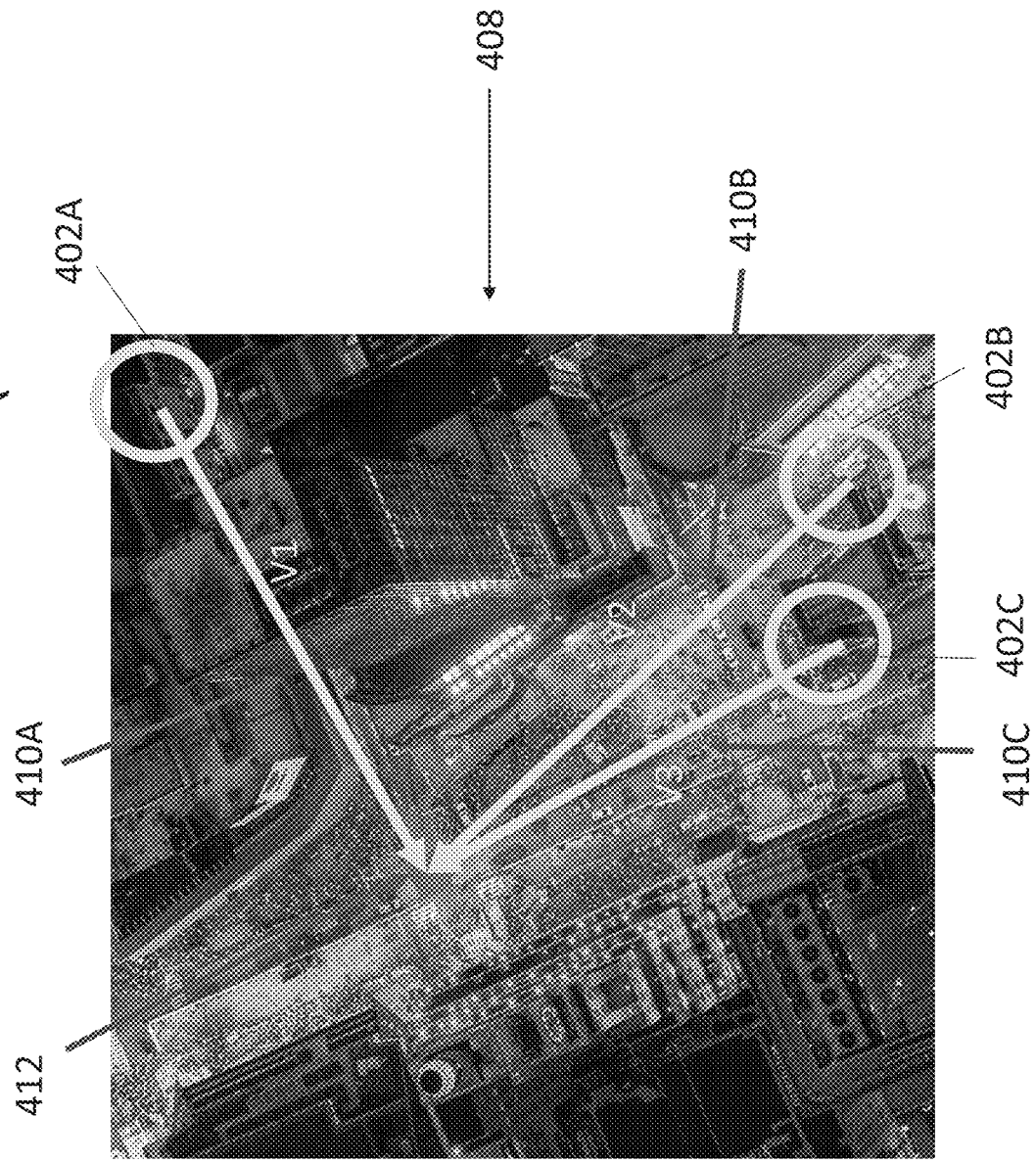

IMAGE BASED LOCALIZATION

RELATED APPLICATION(S)

This application is a Continuation-In-Part (CIP) of U.S. patent application Ser. No. 17/689,109 filed on Mar. 8, 2022, the contents of which are all incorporated by reference as if fully set forth herein in their entirety.

FIELD AND BACKGROUND OF THE INVENTION

The present invention, in some embodiments thereof, relates to image processing and, more specifically, but not exclusively, to computing a location of an object based on an analysis of images.

Standard localization approaches include, for example, analyzing an image to determine a famous landmark such as the Statue of Liberty and determining the location as Liberty Island, or using a location sensor such as a global positioning sensor to obtain coordinates of a current location.

SUMMARY OF THE INVENTION

According to a first aspect, a computer implemented method of computing a location of an object, comprises: accessing a wide field of view (wFOV) image captured by a wFOV image sensor located relative to an object, analyzing the wFOV image to identify a predefined feature, wherein the predefined feature indicates a low accuracy location of the object, capturing a high resolution image by a high resolution image sensor located relative to the object, the high resolution image depicting the predefined feature, and computing a high accuracy of location of the object according to an analysis of the predefined feature and according to a correlation between a location and orientation of the wFOV image sensor and the high resolution image sensor.

According to a second aspect, a system for computing a location of an object, comprises: accessing a wide field of view (wFOV) image captured by a wFOV image sensor located relative to an object, analyzing the wFOV image to identify a predefined feature, wherein the predefined feature indicates a low accuracy location of the object, capturing a high resolution image by a high resolution image sensor located relative to the object, the high resolution image depicting the predefined feature, and computing a high accuracy of location of the object according to an analysis of the predefined feature and according to a correlation between a location and orientation of the wFOV image sensor and the high resolution image sensor.

According to a third aspect, a non-transitory medium storing program instructions for computing a location of an object, which, when executed by a processor, causes the processor to: access a wide field of view (wFOV) image captured by a wFOV image sensor located relative to an object, analyze the wFOV image to identify a predefined feature, wherein the predefined feature indicates a low accuracy location of the object, capture a high resolution image by a high resolution image sensor located relative to the object, the high resolution image depicting the predefined feature, and compute a high accuracy of location of the object according to an analysis of the predefined feature and according to a correlation between a location and orientation of the wFOV image sensor and the high resolution image sensor.

In a further implementation form of the first, second, and third aspects, further comprising feeding the high accuracy of the location into a controller for controlling movement of the object.

In a further implementation form of the first, second, and third aspects, the object is selected from a group comprising: a vehicle, a robot, an autonomous car, and a drone.

In a further implementation form of the first, second, and third aspects, further comprising: generating instructions for adjustment of at least one of an orientation and a location of the high resolution image sensor for capturing the high resolution image, wherein the high accuracy location of the object is computed according to a correlation between the location and orientation of the wFOV image sensor and the orientation and location of the high resolution image sensor in response to implementing the generated instructions.

In a further implementation form of the first, second, and third aspects, the location and orientation of the high resolution image sensor is adaptable relative to the object and adaptable relative to the wFOV image sensor, wherein generating instructions comprises generating instructions for execution by a controller that adjusts the at least one of the orientation and the location of the high resolution image sensor relative to the object.

In a further implementation form of the first, second, and third aspects, further comprising dynamically computing the correlation between the location and orientation of the wFOV image sensor used to capture the wFOV image and the location and orientation of the high resolution image senor used to capture the high resolution image, wherein the dynamically computed correlation is used to dynamically compute the high accuracy of the location.

In a further implementation form of the first, second, and third aspects, the location and orientation of the high resolution image sensor is fixed with respect to the object and fixed with respect to the wFOV image sensor, and wherein generating instructions comprises generating instructions for execution by a controller that adjusts at least one of an orientation and location of the object thereby adjusting the at least one of orientation and location of the high resolution image sensor.

In a further implementation form of the first, second, and third aspects, further comprising computing the correlation between the location and orientation of the wFOV image sensor and the location and orientation of the high resolution image sensor prior to the capture of the wFOV image and the high resolution image, and accessing the previously computed correlation for computing the high accuracy of the location.

In a further implementation form of the first, second, and third aspects, the correlation comprises a mapping from pixels of the wFOV image to pixels of the high resolution image, the mapping computed according to a relationship between a location, orientation, and pixel resolution of the wFOV image sensor and location, orientation, and pixel resolution of the high resolution image sensor.

In a further implementation form of the first, second, and third aspects, further comprising: computing an initial low accuracy location of the object based on the wFOV image, and computing a higher accuracy location of the object as a correction of the initial low accuracy location based on the high resolution image.

In a further implementation form of the first, second, and third aspects, the wFOV image comprises a single image, wherein the single image is analyzed to identify a plurality of predefined features, further comprising each one of a plurality of predefined featured: accessing a high resolution image depicting the one predefined feature, computing a candidate location of the object based on the high resolution image, and computing the high accuracy of the location of the object as an aggregation of a plurality of the candidate locations.

In a further implementation form of the first, second, and third aspects, the candidate location is computed as a vector pointing between the one predefined feature and the object, and wherein the high accuracy of the location of the object is computed as a intersection of a plurality of the vectors.

In a further implementation form of the first, second, and third aspects, the wFOV sensor comprises a wFOV camera, and the high resolution sensor comprises a pan-tilt-zoom (PTZ) camera.

In a further implementation form of the first, second, and third aspects, the wFOV sensor captures images at a resolution below a threshold above a zoom level, and the high resolution sensor captures images at a resolution above the threshold when above the zoom level.

In a further implementation form of the first, second, and third aspects, the wFOV image sensor and the high resolution image sensor are a same image sensor, wherein the high resolution image is created by a physical optical zoom-in operation.

In a further implementation form of the first, second, and third aspects, further comprising activating an electromagnetic illumination source at a selected illumination pattern for generating electromagnetic illumination for providing visibility of the predefined feature, wherein at least one of the wFOV image and the high resolution images are captured at the electromagnetic spectrum of the electromagnetic illumination.

In a further implementation form of the first, second, and third aspects, the electromagnetic illumination source generates electromagnetic illumination at the short wave infrared (SWIR) range, and at least one of the wFOV image sensor and the high resolution image sensor comprises a SWIR sensor.

In a further implementation form of the first, second, and third aspects, the SWIR range comprises a solar blind range.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a schematic depicting computation of a location of an object with high accuracy using a wFOV image and by aggregating multiple fine resolution vectors computed from high resolution images, in accordance with some embodiments of the present invention.

DESCRIPTION OF SPECIFIC EMBODIMENTS OF THE INVENTION

Figure 1:
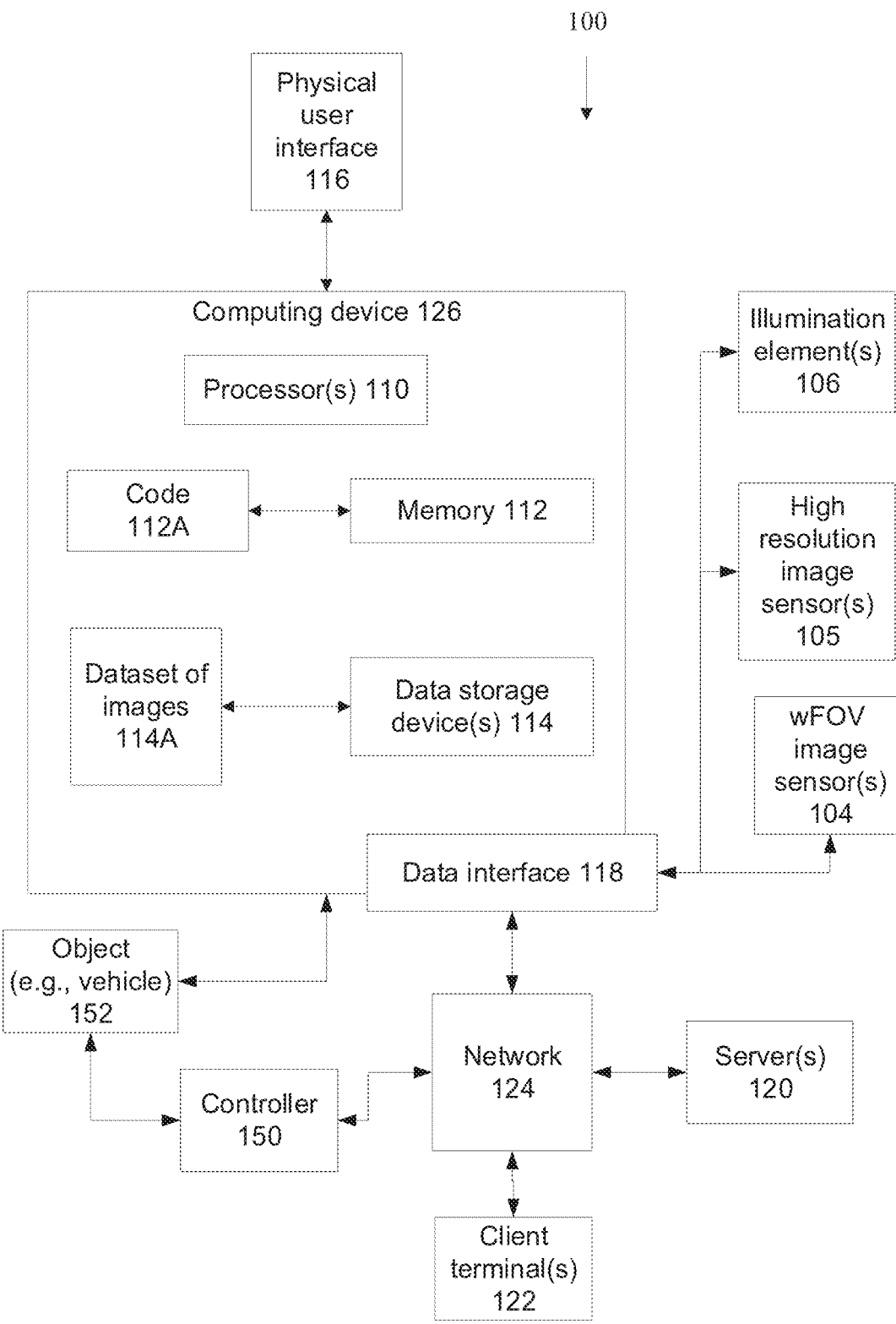
FIG. 1 is a schematic of a block diagram of components of a system for computing a location of an object based on an analysis of image(s) captured by a wFOV image sensor(s) and image(s) captured by a high resolution image sensor(s), in accordance with some embodiments of the present invention.

The present invention, in some embodiments thereof, relates to image processing and, more specifically, but not exclusively, to computing a location of an object based on an analysis of images.

An aspect of some embodiments of the present invention relates to systems, methods, computing devices, and/or code instructions (stored on a memory and executable by one or more processors) for computing a high resolution location of an object using a wide field of view (wFOV) image and one or more high resolution images, for example, for controlling movement of an object such as a robot. A processor accesses one or more wFOV images, optionally of a low resolution, captured by a wFOV image sensor located relative to the object, optionally on the object. The processor analyzes the wFOV image to identify one or more predefined features, for example, physical codes (e.g., plate with lines of retroreflectors), and/or selected environmental features (e.g., edge of building, top of trees). A high resolution image sensor located relative to the object (e.g., on the object) captures one or more high resolution images depicting the predefined features. The object and/or the camera may be oriented towards the predefined features according to the analysis. The processor computes and/or obtains a correlation between a location and/or orientation of the wFOV image sensor and the high resolution image sensor. A high accuracy location of the object is computed according to an analysis of the predefined feature(s) and according to the correlation. The high accuracy location may be, for example, fed into a controller for controlling movement of the object, for example, controlling movement of a robot, autonomous vehicle (e.g., automatic self-parking), and the like.

At least some implementations of the systems, methods, computing devices, and/or code instructions described herein address the technical problem and/or improve the technical field and/or improve upon prior approaches, of computing a high accuracy location of an object, optionally for controlling movement of the object (e.g., navigation).

Prior approaches for image localization include, for example, analyzing a 2D marker, and/or 3D object depicted in a single image to compute relative distance and orientation from the camera capturing the image. The limitation of the prior approaches is the tradeoff of resolution (distance) and location precision. For example, if a 2D marker appears in the image taken by a camera system to be 20×20 pixels in size, it is difficult to estimate the angles to it and the distance from it at a precision exceeding ~5% (1/20). This is especially problematic when the camera and/or object is located at a far distance from the feature that is used to compute the location and/or orientation of the camera and/or object.

In at least some implementations, the technical problem is solved by, and/or the technical field is improved by, and/or improvements over prior art approaches are based on, analyzing a wFOV image, optionally a low resolution image, to identify one or more predefined features. The predefined features may be used to compute a low accuracy location of the object. The identified predefined feature of the wFOV image may guide adjustment of a position and/or orientation of a high resolution image sensor to obtain a high resolution image depicting the same predefined feature. The high accuracy location of the object according to an analysis of the predefined feature and according to a correlation between a location and orientation of the wFOV image sensor and the high resolution image sensor.

At least some implementations of the systems, methods, computing devices, and/or code instructions described herein address the technical problem and/or improve the technical field and/or improve upon prior approaches, of computing a location of an object and/or of controlling movement of an object (e.g., navigation), optionally in view of one or more of:

With high accuracy and/or resolution of the location and/or movement, for example, automatic parking in a parking lot, and a vacuum cleaning robot that is programmed to clean all floor surfaces in an office. The accuracy and/or resolution of the location of the object computed using embodiments described herein may be much higher than accuracy and/or resolution of location of the object computed using standard positioning systems such as global positioning system (GPS).

When no standard positioning system are available, for example, GPS, and/or triangulation of location using feedback from cellular communication towers is available. Such standard systems may not be installed on the object. Such systems may not be operable, for example, in underground parking lots, and/or high up in office towers, and/or on a moving boat.

As an add-on to an object. Embodiments described herein may be installed on existing objects, by installing imaging sensor(s) and storing code on a memory for execution by one or more processors, for example, on a mobile device (e.g., smartphone), on a car, and on a robot. Almost any object capable of movement may be provided with real time location.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
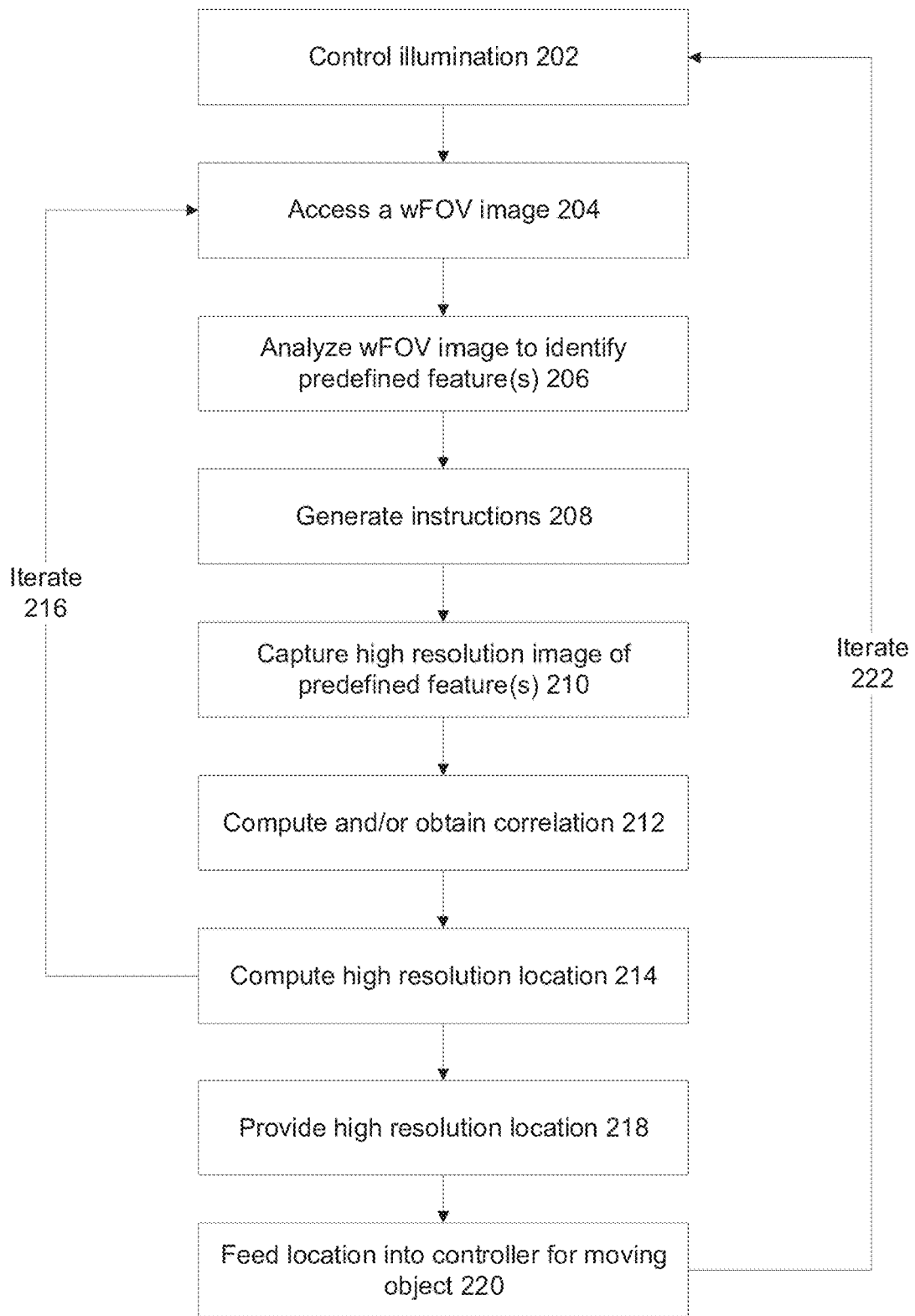
FIG. 2 is a flowchart of a method of computing a location of an object based on an analysis of image(s) captured by a wFOV image sensor(s) and image(s) captured by a high resolution image sensor(s), in accordance with some embodiments of the present invention.
Figure 3:
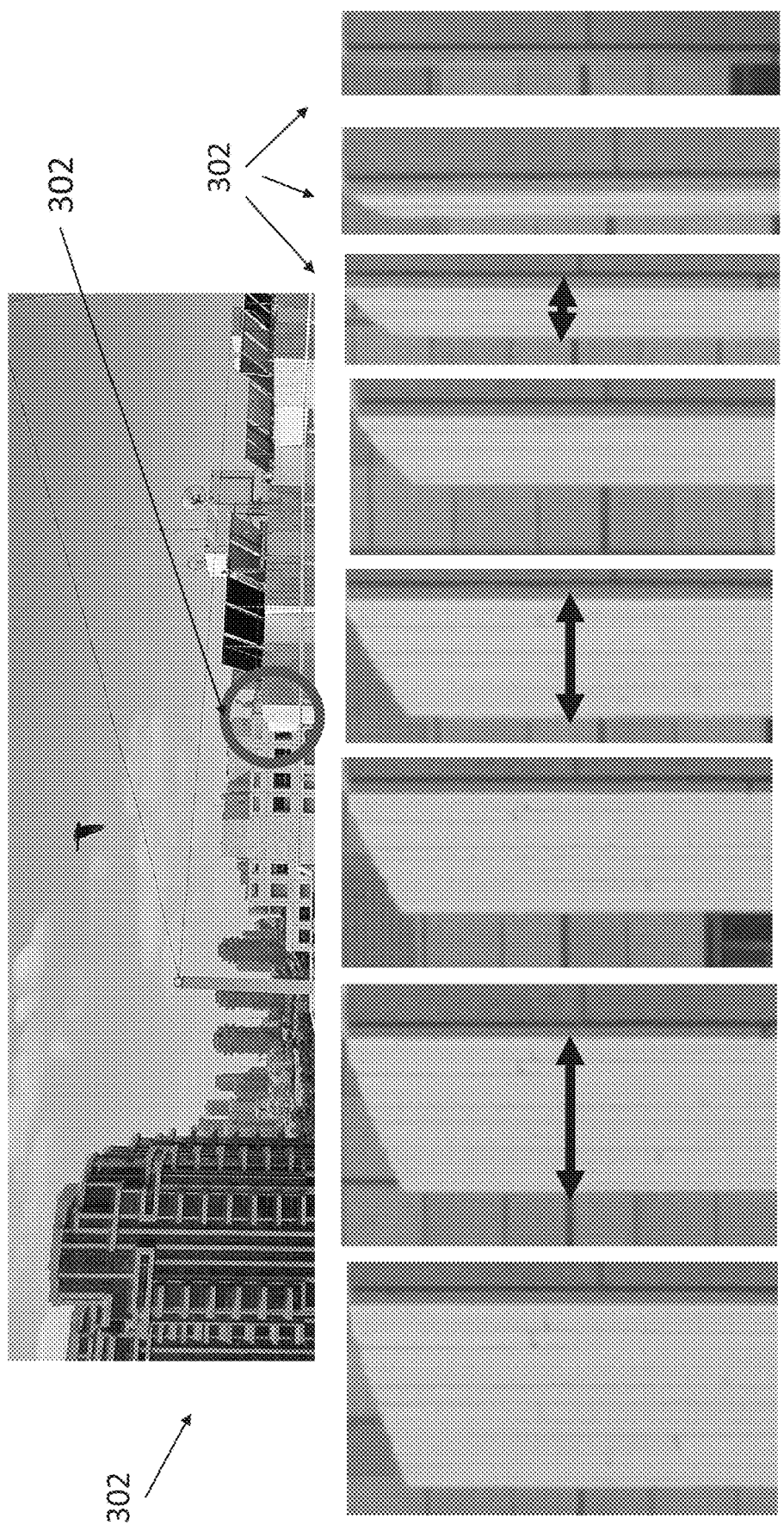
FIG. 3 is a schematic depicting using a 3D object for computing a high accuracy location of an object based on a predefined feature depicted in a wFOV image and one or more high resolution images of the predefined feature, in accordance with some embodiments of the present invention.

Reference is now made to FIG. 1, which is a schematic of a block diagram of components of a system 100 for computing a location of an object 152 based on an analysis of image(s) captured by a wFOV image sensor(s) 104 and image(s) captured by a high resolution image sensor(s) 105, in accordance with some embodiments of the present invention. Reference is also made to FIG. 2, which is flowchart of a method of computing a location of an object based on an analysis of image(s) captured by a wFOV image sensor(s) and image(s) captured by a high resolution image sensor(s), in accordance with some embodiments of the present invention. Reference is also made to FIG. 3, which is a schematic depicting using a 3D object for computing a high accuracy location of an object based on a predefined feature 302 depicted in a wFOV image 304 and one or more high resolution images 306 of the predefined feature, in accordance with some embodiments of the present invention. Reference is also made to FIG. 4, which is a schematic depicting computation of a location of an object with high accuracy using a wFOV image and by aggregating multiple fine resolution vectors computed from high resolution images, in accordance with some embodiments of the present invention.

System 100 may implement the acts of the method described with reference to FIGS. 2-4, by processor(s) 110 of a computing device 126 executing code instructions (e.g., code 112A) stored on a memory 112.

The location of object 152 is computed based on an analysis of wFOV image captured by wFOV image sensor(s) 104, and based on an analysis of high resolution images captured by high resolution image sensor(s) 105, as described herein.

Object 152 may be, for example, a robot, a drone, and/or a vehicle, such as a car (e.g., autonomous, semi-autonomous), a motorcycle, and a wheelchair.

Object 152 may be in communication with a controller 150 that receives the computed location of object 152. Controller 150 may, for example, generate instructions for automated movement and/or navigation of object 152 according to the computed location.

Imaging sensors 104 and 105 may be implemented as two distinct physical sensor, or as a single sensor with the capability of capturing wFOV images and high resolution images, for example, as described herein in additional detail.

Imaging sensor(s) 104 and/or 105 may capture images at certain wavelengths, for example, one or more ranges within the visible light spectrum, ultraviolet (UV), infrared (IR), near infrared (NIR), and the like. Examples of imaging sensor(s) 104 and/or 105 include a camera and/or video camera and/or a pan-tilt-zoom (PTZ) camera, such as CCD, CMOS, and the like. Imaging sensor(s) 104 and/or 105 may be implemented as, for example, a short wave infrared (SWIR) sensor that captures SWIR image(s) at a SWIR wavelength, optionally including a solar blind range. Examples of SWIR sensor(s) 104 and/or 105 include: Plasmon based CMOR, balometer array based FIR, and 3D passive imaging.

As used herein, the term "solar blind range" refers to the wavelength spectrum at which electromagnetic radiation (e.g., generated by sunlight and/or artificial light sources) is highly (e.g., mostly) absorbed in the atmosphere (e.g., by water vapor in air) and/or has low emission for example, the range of about 1350-1450 nm, optionally 1360-1380 nm. Additional details of the solar blind range and SWIR sensor(s) for capturing image at the solar blind range are described herein and/or with reference to U.S. patent application Ser. No. 17/689,109 filed on Mar. 8, 2022, by at least one common inventor of the instant application, the contents of which are incorporated herein by reference in their entirety.

Optionally, system 100 may include one or more illumination elements 106 that generate electromagnetic illumination at a selected electromagnetic frequency range that is captured by imaging sensor(s) 104, for example, SWIR illumination optionally at the solar blind range, one or more ranges within the visible light spectrum (e.g., white or one or more colors), ultraviolet (UV), infrared (IR), near infrared (NIR), and the like.

System 100 includes a computing device 126, for example one or more and/or combination of: a group of connected devices, a client terminal, a vehicle electronic control unit (ECU), a server, a computing cloud, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

System 100 and/or computing device 126 include one or more processor(s) 110, which may interface with imaging sensor(s) 104 and/or 105 for receiving image(s) that include the predefined feature(s). Processor(s) 110 may interface with other components, described herein. Processor(s) 110 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 110 may include a single processor, or multiple processors (homogenous or heterogeneous) arranged for parallel processing, as clusters and/or as one or more multi core processing devices.

System 100 and/or computing device 126 include a memory 112, which stores code 112A for execution by processor(s) 110. Code 112A may include program instructions for implementing one or more features of the method described with reference to FIGS. 2-4, as described herein. Memory 112 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

System 100 and/or computing device 126 include a data storage device(s) 114, which may store data, for example, a dataset of captured images 114A, for example, wFOV images that are analyzed to identify predefined feature(s) which are used to capture high resolution images of the predefine features, as described herein. Data storage device(s) 114 may be implemented as, for example, a memory, a local hard-drive, virtual storage, a removable storage unit, an optical disk, a storage device, and/or as a remote server and/or computing cloud (e.g., accessed using a network connection).

System 100 and/or computing device 126 may include a physical user interface 116 that includes a mechanism for user interaction, for example, to enter data and/or to view data. Exemplary physical user interfaces 116 include, for example, one or more of, a touchscreen, a display, gesture activation devices, a keyboard, a mouse, and voice activated software using speakers and microphone.

System 100 and/or computing device 126 may include a data interface 118 for providing communication with controller 150 and/or other external devices (e.g., server(s) 120 and/or client terminal(s) 122) optionally over a network 124, for example, for receiving images of surface 108 and/or providing the determined location of object 152. Data interface 118 may be implemented as, for example, one or more of, a network interface, a vehicle data interface, a USB port, a network interface card, an antenna, a wireless interface to connect to a wireless network, a short range wireless connection, a physical interface for connecting to a cable for network connectivity, a virtual interface implemented in software, network communication software providing higher layers of network connectivity, and/or other implementations.

There may be one or more controllers 150, for example, for controlling movement of object 152 (e.g., vehicle) and/or for adjust position and/or orientation of high resolution image sensor(s) 105 and/or wFOV image sensor(s) 104. In some embodiments, controller 150 may be a vehicle control in communication with vehicle 152, that computes instructions for navigation of the vehicle based on the computed location.

Computing device 126 may interface with other components using data interface 118, for example, with illumination element 106 (e.g., for controlling an illumination pattern) and/or with imaging sensor 104.

Network 124 may be implemented as, for example, a vehicle network, the internet, a broadcast network, a local area network, a virtual network, a wireless network, a cellular network, a local bus, a point to point link (e.g., wired), and/or combinations of the aforementioned. It is noted that a cable connecting processor(s) 110 and another device may be referred to herein as network 124.

System 100 may be implemented as different architectures. For example, in a server-client architecture, computing device 126 is implemented as a server that receives images of captured by imaging sensors 104 and 105 from a client terminal 122 over network 124. Imaging sensors 104 and/or 105 are located on object 152. Client terminal 122 may be located on object 152, or located externally to object 152 and in communication with imaging sensors 104 and/or 105. Computing device 126 computes the location as described herein, and provides the location, for example, to controller 150 for navigation of object 152 and/or to client terminal 122. In another local example, computing device 126 is implemented as a local computer that receives images captured by imaging sensors 104 and 105 and locally computes the location as described herein, and provides the location. For example, computing device 126 is located as software and/or hardware installed in a vehicle for on-board imaging and control of the vehicle.

Referring now back to FIG. 2, at 202, an electromagnetic illumination source may be activated at a selected illumination pattern for generating electromagnetic illumination for providing visibility of the predefined feature. The electromagnetic illumination may be activated during capture of the wFOV image and/or capture of the high resolution image. The wFOV image and/or the high resolution image may be captured at the electromagnetic spectrum of the selected electromagnetic illumination applied by the electromagnetic illumination source.

The electromagnetic illumination source generating electromagnetic illumination may be, for example, a light source generating light at the visible spectrum, for example, white light, or colored light of one or more colors. The wFOV image sensor and/or the high resolution image sensor may be, for example, one or more cameras.

The electromagnetic illumination source may generate electromagnetic illumination at the short wave infrared (SWIR) range, optionally a solar blind range. The wFOV image sensor and/or the high resolution image sensor may include one or more SWIR sensors, optionally set for capturing images in the solar blind range. The wFOV images and/or the high resolution images captured by SWIR sensors may be referred to as SWIR image(s).

Optionally, one or more filters are included in the system described with reference to FIG. 1. The filter(s) filter out electromagnetic radiation at wavelengths which are mostly non-absorbed by water vapor in air depicted in the scene. The filter passes electromagnetic radiation at wavelengths which are most absorbed by water vapor in air depicted in the scene. The filter may be a spectral narrow pass-band filter that passes wavelengths of about 1350-1450 nanometers (nm) and excludes wavelengths over about 1450 nm and below about 1350 nm, optionally the filter passes wavelengths of about 1360 nm-1380 nm and excludes wavelengths of over about 1380 nm and under about 1360 nm. The filter generates solar blind images at the solar blind range. The wavelengths in the solar blind range are designed to be emitted by the SWIR illumination element, filtered by the filter, and captured by the SWIR sensor for generating the SWIR image(s), as described herein. A standard visible light camera (e.g., RGB, CMOS, CCD) located behind the filter generates image of the scene that appear dark. Sunlight is naturally blocked in the wavelength range that is passed by the filter. Artificial light sources do not emit significant amounts of electromagnetic radiation at the wavelength range that is passed by the filter. Such dark images of the scene cannot be used to significantly discern the predefined feature(s) described herein. One or more SWIR sensors capture the SWIR illumination of the SWIR wavelength range, where the SWIR illumination passes through the filter prior to hitting the SWIR sensor. The SWIR images depict the scene independently of the amount of sun and/or artificial light, generating images that are free of glare from the sun, images captured at night in which features of objects may be significantly determined, and/or images that appear similar regardless of the time of day and/or environment (e.g., clouds, sunny, rain, snow, and the like).

It is noted that in some embodiments, the filter may be omitted and/or built in to the SWIR sensors and/or the SWIR illumination element. For example, the SWIR sensor(s) is designed to capture electromagnetic energy having wavelengths in the solar blind range without necessarily requiring a filter, and/or using a built-in filter. In another example, the SWIR illumination element is designed to generate electromagnetic energy having wavelengths in the solar blind range without necessarily requiring a filter, and/or using a built-in filter.

Additional details of the solar blind range and SWIR sensor(s) for capturing image at the solar blind range are described, for example, with reference to U.S. patent application Ser. No. 17/689,109 filed on Mar. 8, 2022, by at least one common inventor of the instant application, the contents of which are incorporated herein by reference in their entirety.

Illumination and/or sensor may be at other electromagnetic frequency ranges, for example, UV, IR, NIR, as described herein.

At 204, the processor accesses one or more wFOV images captured by a wFOV image sensor located relative to an object. The processor may generate instructions for triggering capture of the wFOV image by the wFOV image sensor(s), for example, the processor generates instructions for stopping motion of the object, and optionally capturing wFOV image(s) when the object is at rest. Alternatively, the wFOV image sensor(s) captures wFOV images based on another trigger, for example, continuously at a set frame rate, where the most recent wFOV image(s) may be used.

Optionally, the wFOV image sensor(s) is installed on the object itself.

The object may be, for example, a vehicle, a robot, an autonomous car, and a drone. The process of computing the high resolution location may be used, for example, to automatically park a car at a correct spot, control a robot for precise navigation within a terrain, and/or land a drone at a specific landing site.

At 206, the processor analyzes the wFOV image to identify a predefined feature. The predefined feature may be, for example, a physical object with 2D surface placed in the environment designed to act as a code (e.g., reflective strips and/or non-reflecting strips arranged in a specific encoding pattern), a physical feature of an existing 3D object (e.g., edge of a building, top of tree, pole), lenticular targets whose image/appearance varies strongly with the viewing angle, and the like. The predefined feature may be identified, for example, by matching to a pre-created template that includes a pre-captured image depicting the predefined feature capture from different angles and/or different distances, and/or by image processing code such as edge detector, and the like. Once the closest template it identified, the distance and/or angle associated with the template is obtained.

The predefined feature indicates a low accuracy location of the object. For example, the predefine feature may be depicted by a relatively small number of pixels within the wFOV image. Each pixel may represent a region with a relatively large error, i.e., relatively low accuracy. For example, a 10 centimeter×10 centimeter plaque on a wall of skyscraper captured in an wFOV view of the street may be identified with relatively low accuracy.

At 208, the processor generates instructions for adjustment of the orientation and/or location of the high resolution image sensor for capturing the high resolution image depicting the predefined feature(s). The instructions may be generated according to the computed location of the predefined feature based on the wFOV image. The instructions may be for capturing high resolution image(s) depicting a single predefined feature, optionally approximately in the middle of the high resolution image and/or in another preset region. For example, in the case of the plaque on the wall of a building in a wFOV image of the street, the instructions are to direct the camera to capture the high resolution image depicting the predefined feature(s) approximately in the center of the high resolution image.

Optionally, the location and/or orientation of the high resolution image sensor is adaptable relative to the object and/or adaptable relative to the wFOV image sensor. For example, a motor such as a stepper motor is connected to a mechanism that adjusts the position of the high resolution image sensor. The mechanism and high resolution image sensor may be installed on the object. In such implementation, the processor generates instructions for execution by the controller that adjusts the orientation and/or the location of the high resolution image sensor relative to the object. The orientation and/or location of the object itself may be unchanged.

Alternatively or additionally, the location and orientation of the high resolution image sensor is fixed with respect to the object and fixed with respect to the wFOV image sensor. For example, the high resolution image sensor is fixed in position on the object. In such implementation, the processor generates instructions for execution by a controller that adjusts the orientation and/or location of the object itself, thereby adjusting the orientation and/or location of the high resolution image sensor.

At 210, one or more high resolution images captured by the high resolution image sensor are obtained. The high resolution images depict the predefined feature(s).

The high resolution image may depict a smaller field of view than the wFOV image, at a higher resolution than the wFOV image. The higher resolution image may be at a higher zoom level than the wFOV image. For a same object, the high resolution image may include a large number of pixels depicting the object than the number of pixels depicting the same object by the low resolution image. For example, the wFOV image depicts a street with multiple buildings, one of which includes a plaque on a wall of the building. The high resolution image depicts only a part of the building with the plaque with the plaque depicted as much larger than in the wFOV image.

For a same zoom level, the resolution of the high resolution images is higher than the resolution of the wFOV images. The wFOV sensor may capture images at a resolution below a threshold above a zoom level. The high resolution sensor may capture images at a resolution above the threshold when above the zoom level.

Optionally, the wFOV image sensor and the high resolution image sensor may be implemented as the same image sensor. The high resolution image may be created by a physical optical zoom-in operation that controls the image sensor to zoom-in on the predefined feature identified in the wFOV image. The high resolution image is captured by the same camera, by zooming in on the predefined feature.

Alternatively, the wFOV image sensor and the high resolution image sensor are two physically distinct cameras, each designed for a different purpose. The wFOV image sensor may be implemented as a wide angle camera with a wide angle lens. The high resolution image sensor may be implemented as a PTZ camera, which enables captures high resolution images of a smaller wFOV, while enabling adjusting the position and/or orientation of the camera to capture the predefined feature in the high resolution image.

At 212, the processor access and/or computes a correlation between a location and/or orientation of the wFOV image sensor and the high resolution image sensor.

The correlation may include a mapping from pixels of the wFOV image to pixels of the high resolution image. The mapping between pixels may be computed according to a relationship (e.g., function) between a location, orientation, and pixel resolution of the wFOV image sensor and location, orientation, and pixel resolution of the high resolution image sensor. The correlation enables computing the location of the object with high accuracy, once the location of the object is known with low accuracy based on the predefined feature identified in the wFOV image and according to the mapping between the pixels of the wFOV image depicting the predefined feature and pixels of the high resolution image depicting the predefined feature.

The correlation may be used to map a low resolution location of the object computed from the predefined feature(s) computed from the wFOV image to a high resolution location of the object computed from the predefined feature(s) computed from the high resolution image(s).

Optionally, the processor dynamically computes the correlation between the location and orientation of the wFOV image sensor used to capture the wFOV image and the location and orientation of the high resolution image senor used to capture the high resolution image. The dynamic correlation may be computed when the high resolution image sensor is adjustable relative to the wFOV image sensor, and is dynamically adapted as described herein. The dynamically computed correlation is used to dynamically compute the high accuracy location of the object.

Alternatively, the correlation between the location and orientation of the wFOV image sensor and the location and orientation of the high resolution image sensor is computed prior to the capture of the wFOV image and the high resolution image, for example, by the processor, and/or by another processor such as during manufacturing. The previously computed correlation for computing the high accuracy of the location of the object may be used, for example, when the location and orientation of the high resolution image sensor is fixed with respect to the location and orientation of the wFOV image sensor (in which case the object itself is re-positioned as described herein).

At 214, the processor computes a high accuracy location of the object according to an analysis of the predefined feature and/or according to the correlation.

Optionally, an initial low accuracy location of the object is computed. The initial low accuracy location may be computed based on the predefined feature(s) identified in the wFOV image, and/or based on other approaches such as radiofrequency (RF) triangular, such as for a mobile device. A higher accuracy location of the object may be computed as a correction of the initial low accuracy location based on the high resolution image. For example, the mapping between the pixels of the wFOV image depicting the predefined feature and pixels of the high resolution image depicting the predefined feature is used to map the low accuracy location of the object to the high accuracy location of the object.

At 216, one or more features described with reference to 204-214 may be iterated. The iterations may increase the accuracy of the location of the object, by increasing the number of predefined features used to compute the location of the object.

Optionally, a single wFOV image is accessed. The single wFOV image is analyzed to identify multiple predefined features, features 208-212 may be iterated for each predefined feature. A high resolution image depicting the respective predefined feature is obtained. A candidate location of the object is computed based on the high resolution image. The high accuracy of the location of the object may be computed as an aggregation of the multiple candidate locations. For example, as the union and/or intersection of the multiple candidate locations. In another example, each candidate location is computed as a vector pointing between the respective predefined feature and the object. The high accuracy of the location of the object is computed as a intersection of the multiple vectors.

Features 204-214 may be iterated to obtain another wFOV image, for which another set of predefined features, and/or previously detected predefined features, are identified. The additional set of predefined features may be used to further increase the accuracy of the location of the object.

At 218, the high resolution location is provided. The high resolution location may be fed into a controller of an object (e.g., vehicle, robot, drone) for controlling movement of the object. The high resolution location may be presented on a display. The high resolution location may be forwarded to a remote server, for example, for remote tracking of objects and/or remote navigation of objects. The high resolution location may be forwarded to another process, for example, providing real time information to a driver of a car.

At 220, the high accuracy of the location may be provided to a controller for controlling movement of the object.

Alternatively or additionally, instructions for navigation of the object (e.g., vehicle) may be automatically generated.

The instructions may be, for example, code and/or other signals that automatically control movement of the object, for example, automatically park a car in a parking spot, and automatically navigate a vacuum cleaning robot for covering an entire floor surface of an office.

The instructions may be, for example, audio and/or video and/or text instructions presented to a driver of the vehicle. For example, instructing the driver how to safely park in a dark and/or crowded parking spot without damaging the vehicle and/or nearby vehicles, such as "hard turn to the right", "reverse about 10 centimeters", and "turn the wheel to the left while slowly driving forward".

At 222, one or more features described with reference to 202-220 are dynamically iterated over multiple time intervals. During each iteration, new wFOV images and new high resolution images are obtained and analyzed to compute a real time high resolution location of the object. The dynamic iterations may enable real time localization of the object during motion, for example, for real time navigation of a vehicle and/or robot and/or drone.

Some not necessarily limiting case studies of using approaches described herein to compute a location of an object with high accuracy are now described.

In a first example, a set of 2D barcodes are detected in a wFOV image obtained by a wFOV camera. A PTZ camera is pointed at each one of the 2D barcode to obtain a high resolution image. The resulting higher resolution vectors are used to calculate high precision location vectors indicating the location of the object with high resolution, with much higher precision than using the original wFOV low resolution image alone.

In a second example, a pre-existing high resolution image database of the floor/walls/ceiling of a structure is created. Once a coarse (i.e., low resolution) location and orientation are determined (e.g., using the low resolution wFOV image), a visual search (e.g., by template matching) is done using for example a Zoomed image of the ceiling/floor/wall part to determine the location with higher precision.

In a third example, a pre-existing high resolution image database of visually prominent objects in an area is created. Once the coarse location and orientation are determined, higher resolution (zoomed/magnified) images of known prominent visual objects are taken. The higher resolution images are used to perform a visual search between the images from different views of the prominent object(s) to find the best match, based on which the relative angles and distance can be determined.

Referring now back to FIG. 3, predefined feature 302 depicted in low resolution wFOV image 304 is of a side wall of a building. Predefined feature 302 may be detected, for example, by matching to a template of multiple images of the same structure captured from various angles and/or locations. Predefined feature 302 may be used to obtain a low accuracy location. High resolution images 306 of the predefined feature are obtained with a high resolution camera, for example, at 10× magnification from a distance of about 25 meters. Motion between the frames is of about 4 meters. Wall width (after scale normalization) changes from about 250 pixels to zero. Hence a high resolution of a lateral position of about 1 centimeter (one pixel width change) is achievable.

Referring now back to FIG. 4, multiple predefined features 402A-C are identified in a low resolution wFOV image 404. High resolution images 406A-C of predefined features 402A-C are captured. A distance and orientation vector is computed for each predefined feature, for example, by comparing to a set of templates of images of the same predefined features captured from different angles and/or different distances. Schematics 408 graphically depicts V1 410A computed for predefined feature 402A, V2 410B computed for predefined feature 402B, and V3 410C computed for predefined feature 402C, presented from a birds eye view. A high resolution location 412 is computed as the intersection of V1, V2, and V3. It is noted that the origin on the 3D map of V1, V2, V3 may be determined coarsely from the original wFOV low resolution image 404 and the pre-existing map.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image sensors will be developed and the scope of the term image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of computing a location of an object, comprising:
   accessing a wide field of view (wFOV) image captured by a wFOV image sensor installed on an object;
   analyzing the wFOV image to identify a predefined feature, wherein the predefined feature indicates a low accuracy location of the object;
   capturing a high resolution image by a high resolution image sensor installed on the object, the high resolution image depicting the predefined feature; and
   computing a high accuracy of location of the object according to an analysis of the predefined feature and according to a correlation between a location and orientation of the wFOV image sensor and the high resolution image sensor.

2. The computer implemented method of claim 1, further comprising feeding the high accuracy of the location into a controller for controlling movement of the object.

3. The computer implemented method of claim 1, wherein the object is selected from a group comprising: a vehicle, a robot, an autonomous car, and a drone.

4. The computer implemented method of claim 1, further comprising:
   generating instructions for adjustment of at least one of an orientation and a location of the high resolution image sensor for capturing the high resolution image,
   wherein the high accuracy location of the object is computed according to a correlation between the location and orientation of the wFOV image sensor and the orientation and location of the high resolution image sensor in response to implementing the generated instructions.

5. The computer implemented method of claim 4, wherein the location and orientation of the high resolution image sensor is adaptable relative to the object and adaptable relative to the wFOV image sensor, wherein generating instructions comprises generating instructions for execution by a controller that adjusts the at least one of the orientation and the location of the high resolution image sensor relative to the object.

6. The computer implemented method of claim 5, further comprising dynamically computing the correlation between the location and orientation of the wFOV image sensor used to capture the wFOV image and the location and orientation of the high resolution image senor used to capture the high resolution image, wherein the dynamically computed correlation is used to dynamically compute the high accuracy of the location.

7. The computer implemented method of claim 4, wherein the location and orientation of the high resolution image sensor is fixed with respect to the object and fixed with respect to the wFOV image sensor, and wherein generating instructions comprises generating instructions for execution by a controller that adjusts at least one of an orientation and location of the object thereby adjusting the at least one of orientation and location of the high resolution image sensor.

8. The computer implemented method of claim 7, further comprising computing the correlation between the location and orientation of the wFOV image sensor and the location and orientation of the high resolution image sensor prior to the capture of the wFOV image and the high resolution image, and accessing the previously computed correlation for computing the high accuracy of the location.

9. The computer implemented method of claim 1, wherein the correlation comprises a mapping from pixels of the wFOV image to pixels of the high resolution image, the mapping computed according to a relationship between a location, orientation, and pixel resolution of the wFOV image sensor and location, orientation, and pixel resolution of the high resolution image sensor.

10. The computer implemented method of claim 1, further comprising:
    computing an initial low accuracy location of the object based on the wFOV image; and
    computing a higher accuracy location of the object as a correction of the initial low accuracy location based on the high resolution image.

11. The computer implemented method of claim 1, wherein the wFOV image comprises a single image, wherein the single image is analyzed to identify a plurality of predefined features,
    further comprising each one of a plurality of predefined featured:
        accessing a high resolution image depicting the one predefined feature,
        computing a candidate location of the object based on the high resolution image, and
    computing the high accuracy of the location of the object as an aggregation of a plurality of the candidate locations.

12. The computer implemented method of claim 11, wherein the candidate location is computed as a vector pointing between the one predefined feature and the object, and wherein the high accuracy of the location of the object is computed as a intersection of a plurality of the vectors.

13. The computer implemented method of claim 1, wherein the wFOV sensor comprises a wFOV camera, and the high resolution sensor comprises a pan-tilt-zoom (PTZ) camera.

14. The computer implemented method of claim 1, wherein the wFOV sensor captures images at a resolution below a threshold above a zoom level, and the high resolution sensor captures images at a resolution above the threshold when above the zoom level.

15. The computer implemented method of claim 1, wherein the wFOV image sensor and the high resolution image sensor are a same image sensor, wherein the high resolution image is created by a physical optical zoom-in operation.

16. The computer implemented method of claim 1, further comprising activating an electromagnetic illumination source at a selected illumination pattern for generating electromagnetic illumination for providing visibility of the predefined feature, wherein at least one of the wFOV image and the high resolution images are captured at the electromagnetic spectrum of the electromagnetic illumination.

17. The computer implemented method of claim 16, wherein the electromagnetic illumination source generates electromagnetic illumination at the short wave infrared (SWIR) range, and at least one of the wFOV image sensor and the high resolution image sensor comprises a SWIR sensor.

18. The computer implemented method of claim 17, wherein the SWIR range comprises a solar blind range.

19. A system for computing a location of an object, comprising:
   accessing a wide field of view (wFOV) image captured by a wFOV image sensor installed on an object;
   analyzing the wFOV image to identify a predefined feature, wherein the predefined feature indicates a low accuracy location of the object;
   capturing a high resolution image by a high resolution image sensor installed on the object, the high resolution image depicting the predefined feature; and
   computing a high accuracy of location of the object according to an analysis of the predefined feature and according to a correlation between a location and orientation of the wFOV image sensor and the high resolution image sensor.

20. A non-transitory medium storing program instructions for computing a location of an object, which, when executed by a processor, cause the processor to:
   access a wide field of view (wFOV) image captured by a wFOV image sensor installed on an object;
   analyze the wFOV image to identify a predefined feature, wherein the predefined feature indicates a low accuracy location of the object;
   capture a high resolution image by a high resolution image sensor installed on the object, the high resolution image depicting the predefined feature; and
   compute a high accuracy of location of the object according to an analysis of the predefined feature and according to a correlation between a location and orientation of the wFOV image sensor and the high resolution image sensor.

* * * * *